United States Patent [19]

Barnard et al.

[11] Patent Number: 4,811,369
[45] Date of Patent: Mar. 7, 1989

[54] BIT REVERSING APPARATUS

[75] Inventors: William L. Barnard, Lynnwood, Wash.; Lance A. Glasser, Lexington, Mass.

[73] Assignee: Raytheon Company, Lexington, Mass.

[21] Appl. No.: 92,340

[22] Filed: Sep. 2, 1987

[51] Int. Cl.[4] ............................................. H03K 21/08
[52] U.S. Cl. ........................................ 377/33; 377/54; 377/69; 377/41
[58] Field of Search ............... 377/33, 54, 69; 372/41; 307/242, 243, 576, 579

[56] References Cited

U.S. PATENT DOCUMENTS

| | | | |
|---|---|---|---|
| 3,601,631 | 8/1971 | Miller | 307/243 |
| 4,181,976 | 1/1980 | Collins et al. | 364/900 |
| 4,284,979 | 8/1981 | Flanders et al. | 377/33 |
| 4,665,538 | 5/1987 | Machida | 377/69 |

OTHER PUBLICATIONS

Introduction to VSLI Systems by Carver Mead and Lynn Conway, published in 1980 by Addison-Wesley Publishing Company, Inc. of Reading, MA, pp. 157 to 162.

*Primary Examiner*—John S. Heyman
*Attorney, Agent, or Firm*—Edmund J. Walsh; Richard M. Sharkansky

[57] ABSTRACT

Apparatus is disclosed for reversing the bit order of a portion of a digital word. The apparatus contains a shifter, connected to the input through a bit reversing means, and selector means which forms an output word by selecting appropriate bits either directly from the input word or from the output of the shifter.

3 Claims, 3 Drawing Sheets

4,811,369

BIT REVERSING APPARATUS

BACKGROUND OF THE INVENTION

This invention relates generally to digital circuitry, and more particularly to digital circuitry adapted to reverse the order of the bits in a selected portion of a digital word.

As is known in the art, it is sometimes necessary to reverse the order of the bits or a portion of the bits in a digital word. For example, many Fast Fourier Transform (FFT) processors efficiently perform data manipulations by storing numerous pieces of data into memory at one set of addresses, but reversing the order of bits in the words containing those addresses before retrieving the data from the memory. The data is retrieved from memory in the order in which it is used, thus avoiding the need for any processing dedicated to sorting the data.

The key to the efficiency of processors using bit reversing is that the bit reversing takes less processing than the data sorting which would otherwise be required. One such bit reversing apparatus is described in U.S. Pat. No. 4,181,976, inventors Michael J. Collins and Michael T. S. Ching, issued Jan. 1, 1980 and assigned to the same assignee as the present invention. Although that patent describes apparatus which can reverse the order of the bits in a portion of the word located at one end of the word, it does not accommodate the more general case of reversing the bits in a portion of the word located in the middle of the word. Moreover, significant advantages can be obtained by using low complexity techniques to reverse the bits in a word such that the bit reversing hardware requires a small area on an integrated circuit.

SUMMARY OF THE INVENTION

It is an object of the present invention to provide bit reversing apparatus of low complexity.

It is a further object of the invention to provide a bit reversing apparatus which can reverse the order of bits in any portion of an input digital word.

The foregoing and other objects of the invention are achieved by an apparatus containing a programmed selector which forms an output digital word by selecting bits directly from the input word to make up the non-bit reversed portions of the output word, or, to make up the bit reversed portion of the output word, bits which represent an appropriately shifted version of the bit reversed input word.

BRIEF DESCRIPTION OF THE DRAWINGS

The invention will be more fully understood from the following detailed description when taken in conjunction with the accompanying drawings in which.

DESCRIPTION OF THE PREFERRED EMBODIMENT

Figure 1:
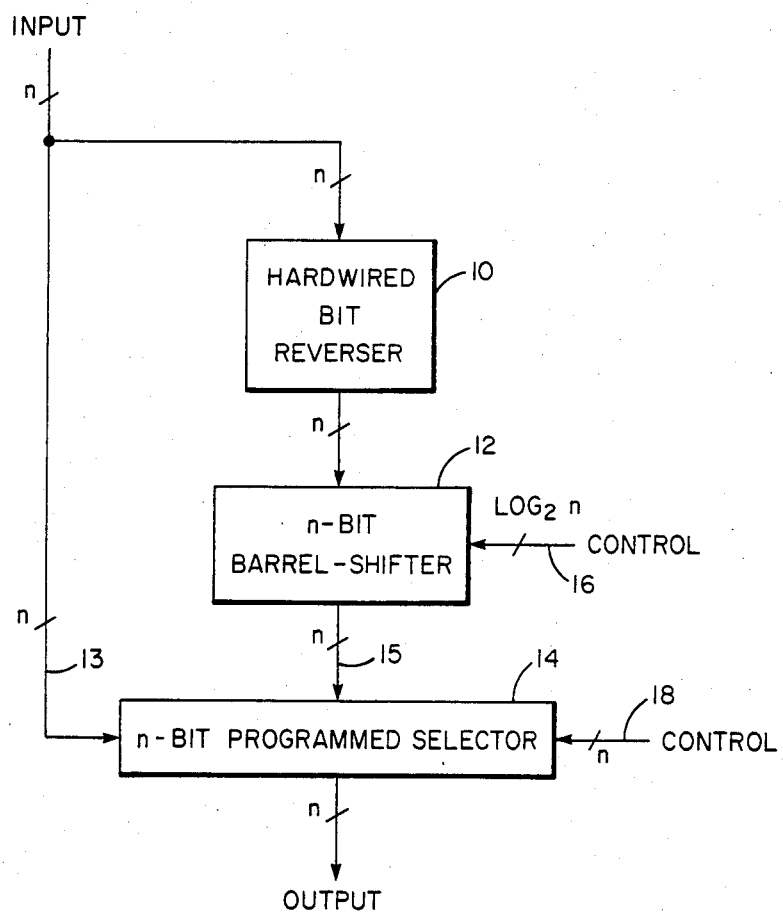
FIG. 1 is a generalized block diagram of the bit reversing apparatus.

FIG. 1 shows a block diagram of the preferred embodiment of the bit reversing apparatus. The input and the output are digital words of any length, here denoted as being of length n. Control signals 16 and 18 determine the portion of the input word to appear reversed in the output word. Control signal 18 has one bit for each bit in the input word. Control signal 16 contains a number of bits equal to $\log_2 n$ or the next greatest integer if $\log_2 n$ is not an integer. The input word is applied to hardwired bit reverser 10 to produce a first intermediate digital word (not numbered) which is applied to a barrel shifter 12. Control input 16 indicates the number of bit positions the value in the barrel shifter 12 should be shifted to produce a second intermediate digital word 15. The second intermediate digital word 15 is applied to one input of programmed selector 14. The input digital word 13 is applied to a second input of programmed selector 14. Control signal 18 directs the programmed selector 14 to select the non-bit reversed portions of the output word from input digital word 13 and the bit reversed portions from the second intermediate digital word 15.

Barrel shifter 12 consists of known circuitry such as that described at pages 157 to 162 of "Introduction to VSLI Systems" by Carver Mead and Lynn Conway, published in 1980 by Addison-Wesley Publishing Company, Inc. of Reading, Mass. Barrel shifter 12 must be able to shift the word applied to its input in either direction as directed by control signal 16. The hardwired bit reverser 10 and the n-bit programmed selector 14 are described in more detail below. One skilled in the art will recognize that standard elements of digital circuits, such as power and timing signals, are not shown in FIG. 1.

Figure 2:
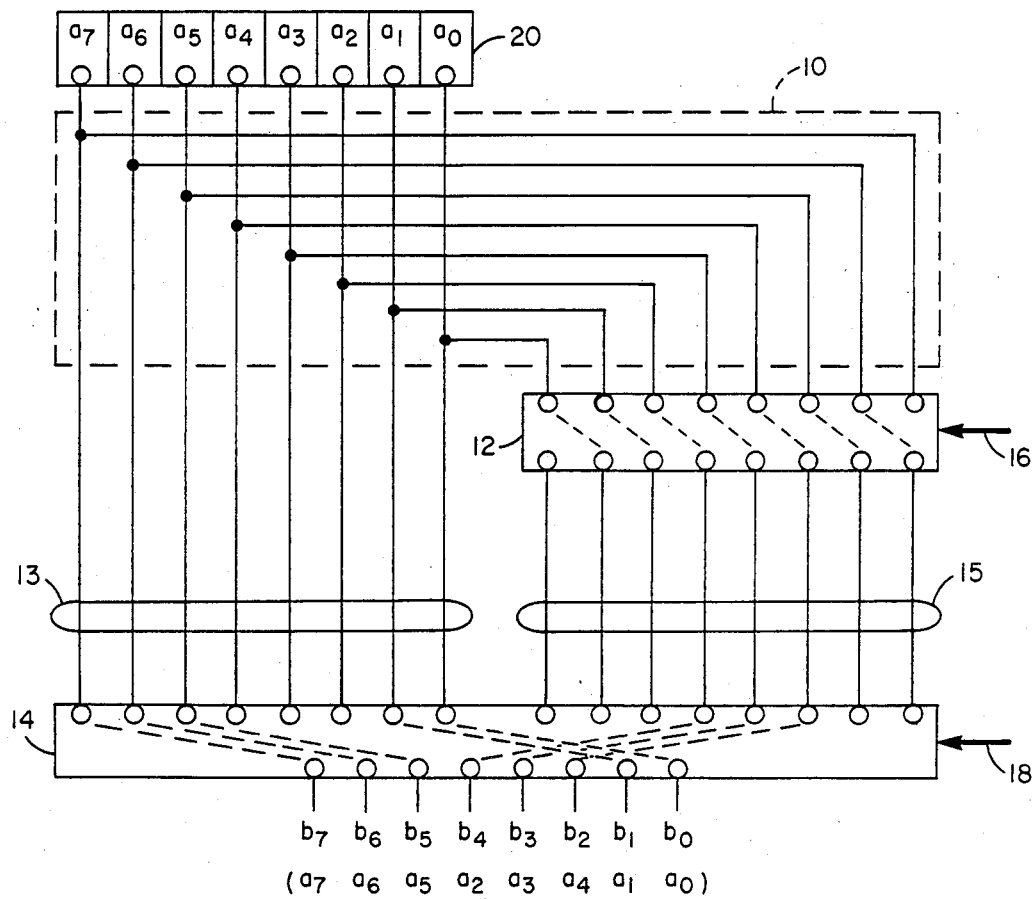
FIG. 2 is a block diagram of an implementation of the bit reversing apparatus showing the flow of data within the apparatus.

The data flow in the bit reversing apparatus is shown in FIG. 2, depicting a bit reversing apparatus constructed to operate on an 8-bit input word. Register 20 is a register of known construction to hold the input word to be processed. It should be noted that the input to the bit reversing apparatus need not be stored in a register but could be applied using any known means. Each bit in the input word is designated by the letter "a", with a subscript indicating its position in the input word. Similarly, each bit in the output word is designated by the letter "b" with a subscript.

Programmed selector 14 has two inputs, input digital word 13 and the second intermediate digital word 15, and one output. Here each input and output is 8 bits wide. The programmed selector 14 forms each bit in the output word by selecting a corresponding bit in the second intermediate digital word 15 or a corresponding bit in input digital word 13. The control signal 18 will be such that the non-reversed bits are selected from the corresponding bits in input digital word 13, while the reversed bits are selected from the corresponding bits of second intermediate digital word 15. For the case shown in FIG. 2, where bits $a_0$, $a_1$, $a_5$, $a_6$ and $a_7$ are not reversed in the output and bits $a_2$, $a_3$ and $a_4$ are reversed, the bits $b_0$, $b_1$, $b_5$, $b_6$, and $b_7$ are selected from the corresponding bits in input digital word 13 and $b_2$, $b_3$ and $b_4$ are selected from the corresponding bits of the second intermediate digital word 15. The operation of the programmed selector 14 to achieve this result is described below in connection with FIG. 3A and FIG. 3B.

The hardwired bit reverser 10 and barrel shifter 12 produce the second intermediate digital word 15 such that bits to appear reversed in the output word occupy the correct bit positions in the signal presented to the programmed selector 14. Hardwired bit reverser 10 reverses all bits in the input word such that the bits to be reversed appear at the input to barrel shifter 12 in the order they must appear in the output word. Note that hardwired bit reverser 10 consists essentially of the way in which the input word is routed to barrel shifter 12. In the case shown in FIG. 2, bits $a_2$, $a_3$ and $a_4$ are to be reversed. By reversing the entire word in hardwired bit reverser 10, bit $a_4$ appears before bit $a_3$ which appears before bit $a_2$, but those bits do not occupy the positions they must occupy in the output word.

Barrel shifter 12 shifts the bit reversed word such that the portion of the word to appear reversed in the output word occupies the correct bit positions in second intermediate digital word 15. The control signal 16 dictates the number of bit positions the barrel shifter should shift the output of the hardwired bit reverser 10. In the case shown in FIG. 2, bit $a_4$ should occupy the third bit position in the output word, bit $a_3$ the fourth and bit $a_2$ the fifth. Bit $a_4$ occupies the fourth bit position in the output of hardwired bit reverser 10, bit $a_3$ the fifth and bit $a_2$ the sixth. Thus, control signal 16 causes the barrel shifter 12 to shift right one bit position. Second intermediate digital word 15 from the output of the barrel shifter 12 thus contains bits $a_4$, $a_3$ and $a_2$ in the third, fourth and fifth bit positions, respectively. As described above, programmed selector 14 selects those bit positions to occupy bits $b_2$, $b_3$ and $b_4$ of the output word, thereby completing the output word with the appropriate bits reversed.

Figure 3A:
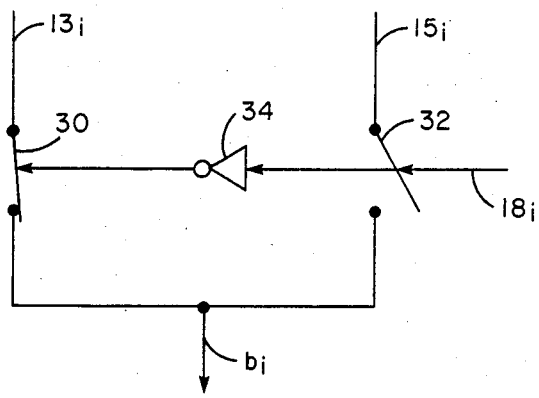
FIG. 3A is a schematic diagram of a bit slice of the programmed selector shown in FIG. 1.

Turning now to FIG. 3A, a schematic diagram of one bit slice of programmed selector 14 (FIG. 1) is shown. Programmed selector 14 has an identical circuit for each bit in the input word. Signal $13_i$ represents the $i^{th}$ bit of input digital word 13. Signal $15_i$ represents the $i^{th}$ bit in second intermediate digital word 15. Control signal $18_i$ represents the $i^{th}$ bit in control signal 18, and $b_i$ represents the $i^{th}$ bit in the output word. Switches 30 and 32 are identical, but inverter 34 ensures that opposite control signals are applied to each. If control signal $18_i$ is a logic HI, switch 30 is open and switch 32 is closed. Thus, a logic HI on control signal $18_i$ causes signal $15_i$ to pass through switch 32 to become bit $b_i$ in the output word. A logic LO causes signal $3_i$ to become the $i^{th}$ bit in the output word.

Figure 3B:
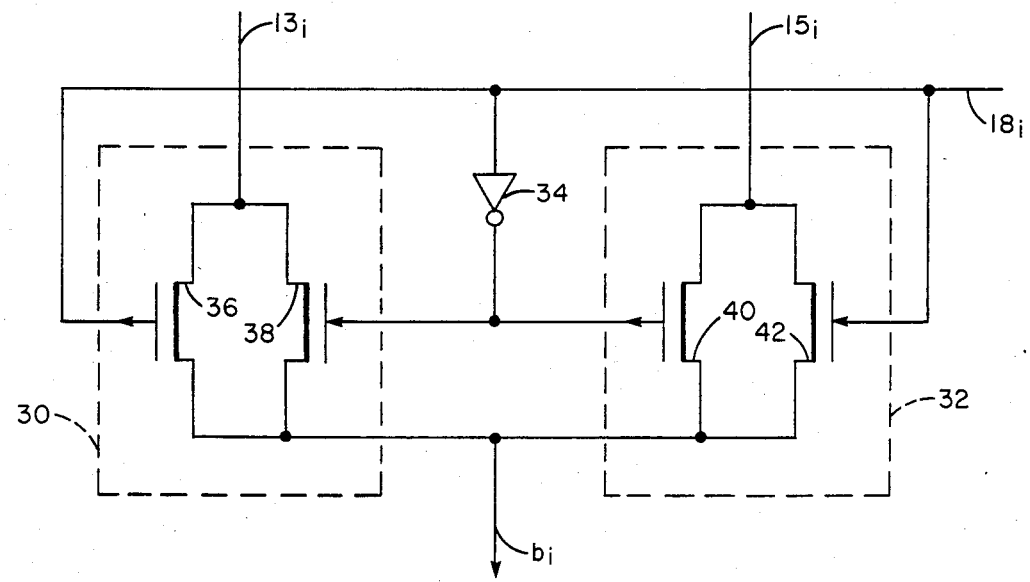
FIG. 3B shows more details of the programmed selector portion shown in FIG. 3A.

FIG. 3B shows a CMOS transistor logic implementation of the schematic in FIG. 3A. Each switch, 30 and 32, is implemented with a pair of transistors, transistors 36 and 38 and transistors 40 and 42, respectively. FIG. 3B shows one transistor of each pair making up switches 30 and 32 to be a p-type transistor and the other transistor of each pair to be an n-type transsstor such that control signal 18 will simultaneously turn on or off both transistors in each switch 30, 32. Inverter 34 is of known construction. One skilled in the art might use such an implementation in a VLSI design incorporating the bit reversing apparatus. It should be noted, however, that numerous other implementations of the schematic in FIG. 3A could be constructed using known techniques.

It should be understood by those skilled in the art that various modifications may be made in the present invention without departing from the spirit and scope thereof as described in the specification and defined in the appended claims.

What is claimed is:

1. Apparatus for reversing a portion of an n-bit digital word comprising:
   (a) bit reversing means for producing a first intermediate digital word equal to the n-bit input digital word in bit reversed order;
   (b) shifter means, responsive to the first intermediate digital word and to a first control input, for producing a second intermediate digital word which has a portion corresponding to the portion of the input digital word to be reversed, such portion of the second intermediate digital word equal to the portion of the input digital word in bit reversed order; and
   (c) selector means, responsive to the input digital word, the second intermediate digital word and a second control input, for forming an output digital word by selecting bits from either the input digital word or the second intermediate digital word.

2. Apparatus for reversing a portion of an n-bit input digital word as in claim 1 wherein the shifter means comprises an n-bit barrel-shifter.

3. Apparatus for reversing a portion of an n-bit digital word as in claim 1 wherein the selector means comprises for each bit in the input digital word:
   (a) a first transistor switch responsive to one bit of the second control input, such transistor switch passing one bit of a first input of the selector means to the output of the selector means when the bit of the second control input is in a first logic state; and
   (b) a second transistor switch responsive to one bit of the second control input, such transistor switch passing one bit of a second input of the selector means to the output of the selector means when the bit of the second control input is in a second logic state.

* * * * *